United States Patent [19]

Schmid

[11] 4,129,158

[45] Dec. 12, 1978

[54] APPARATUS FOR THE REINFORCEMENT OF LENGTHS OF COIL WIRE

[75] Inventor: Hans Schmid, Ruschlikon, Switzerland

[73] Assignee: Meteor AG, Ruschlikon, Switzerland

[21] Appl. No.: 804,240

[22] Filed: Jun. 7, 1977

[30] Foreign Application Priority Data

Jun. 9, 1976 [CH] Switzerland .................. 7241/76

[51] Int. Cl.² .............................................. B21F 7/00
[52] U.S. Cl. .................................................. 140/149
[58] Field of Search ................ 28/289; 140/92.1, 92.2, 140/102, 115, 149

[56] References Cited

U.S. PATENT DOCUMENTS

| 514,177 | 2/1894 | Welch | 140/149 |
| 3,010,494 | 11/1961 | Davis | 140/149 |
| 3,331,178 | 7/1967 | Allers | 140/149 X |
| 3,362,440 | 1/1968 | Meile et al. | 140/149 |
| 3,426,810 | 2/1969 | Schoch et al. | 140/149 |
| 3,804,131 | 4/1974 | Holmes et al. | 140/92.2 |

Primary Examiner—E. M. Combs
Attorney, Agent, or Firm—Cushman, Darby & Cushman

[57] ABSTRACT

The disclosure embraces an apparatus for reinforcing segments or selected lengths of wire such as that used in electric coils by continuously forming a desired number of loops of the wire and then twisting the formed loops together at their midpoint to reinforce the tensile strength of the wire product; the apparatus provides means for forming the loops such as at a point upstream of a coil winding machine and a twisting device for engaging the thus formed loops and twisting them about an axis to form a reinforced length of wire which is then fed to the coil winding machine.

9 Claims, 7 Drawing Figures

APPARATUS FOR THE REINFORCEMENT OF LENGTHS OF COIL WIRE

BACKGROUND AND BRIEF DESCRIPTION OF THE INVENTION

The present invention relates to an apparatus for reinforcing sections of coil wire by forming lengths of the wire into loops and then twisting the loops together.

In the manufacture of electric coils, where wire is wrapped around a core on automatic coil winding machines, it sometimes occurs that, where very fine wire is being employed, the wire breaks and fouls the elements of the coil winding machine. Accordingly, it is desirable to reinforce certain lengths of wire before it is fed to the automatic coil winding machine to minimize the occurrence of such stoppages. Also, certain lengths of the wire should be reinforced where they will be subjected to tension when placed in use, such as the connecting leads to the electric coil.

In a known arrangement for reinforcing such wires, hooks have been employed which are moved into the path of the wire and then rotated in and out of the plane or path of the wire to form the loop. With such an arrangement, the wire is subjected to tension when the hooks first move into the path of the wire to grip the wire and then during the formation of each loop when the hooks are rotated across the path of the wire. Thus, upon each movement of the hooks, the wire is seized again and accelerated which movements, in the case of very thin winding wires, creates strain on the wire which can lead to frequent breaks or undesirable drawing of the wire.

The present invention has for its object the provision of an apparatus for reinforcing a desired section of wire which employs wire transporting means that remains engaged with the wire throughout the period during which the reinforcing process is being effected. Also, the apparatus of the present invention will be capable of handling even very fine wire so that the occurrence of breaks will be minimized, if not eliminated.

In a preferred embodiment, the apparatus of the present invention provides a wire transport means in the form of an eye or ring member which is guided around a closed path which encompasses a pair of guide means or posts of special construction which support the loops formed by the ring member during its travel. With such an arrangement, the wire transport means remains constantly in engagement with the wire and, therefore, may execute a continuous movement in the formation of a wire loops. According to one feature of the present invention, means are provided for disengaging the ring member of the wire transport means from contact with the wire where reinforcement of the lengths of wire passing through the apparatus is not required.

According to another feature of the present invention, the loop forming path of travel of the wire transport means is arranged such that the wire loops are formed without imparting any twist to the wire which could undesirably reduce the tensile strength of the wire.

In a preferred embodiment of the present invention, means are provided for forming loops of different lengths, as desired, without interfering with the loop forming apparatus for the subsequent twisting operation. Also, the twisting means of the present invention are adjustable relative to the formed loops so that the twist may be inserted at approximately the midpoint of the loops and self-compensating means are provided for centering the twisting means whenever a different loop length is being employed.

The foregoing and other advantages of the present invention will become more apparent as consideration is given to the following detailed description and accompanying drawings, in which:

DETAILED DESCRIPTION OF THE INVENTION

Figure 1:
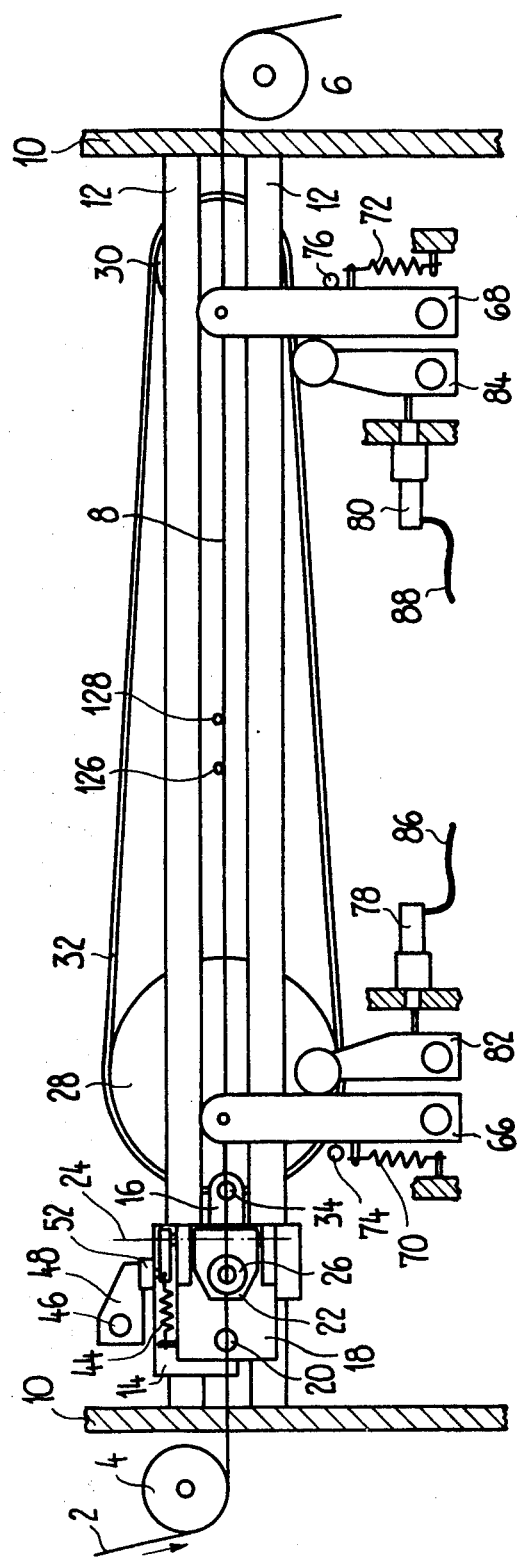
FIG. 1 is a plan view of the bottom of the apparatus of the present invention with parts deleted for clarity.
Figure 2:
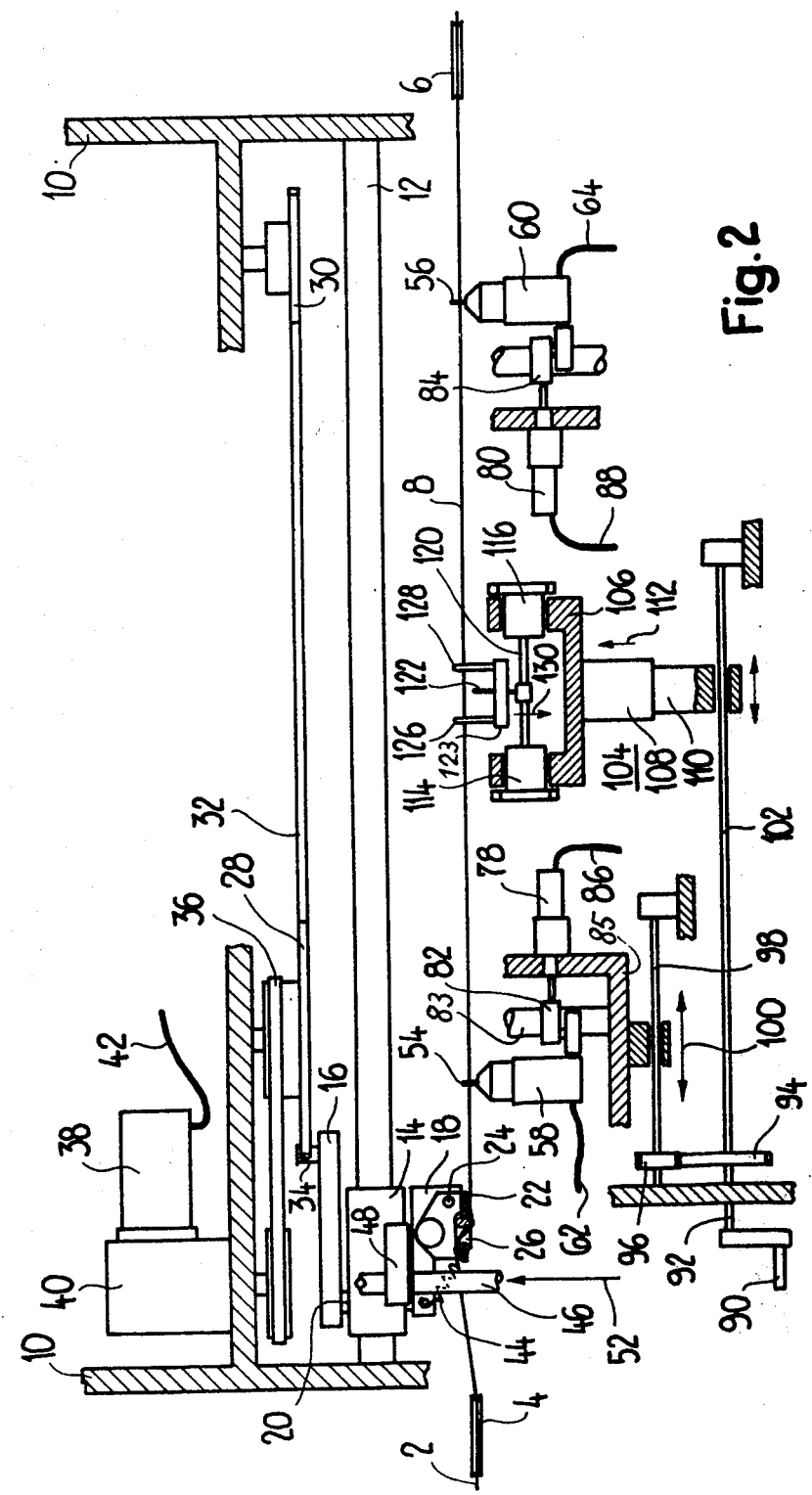
FIG. 2 is a side view in elevation with portions of the support frames deleted for clarity.

Referring now to the drawings wherein like numerals designate corresponding parts throughout the several views, there is shown in FIGS. 1 and 2 the relative disposition of various parts of the present invention. When installed, the apparatus is placed upstream of a coil winding machine which is fed with a wire 2 coming from a delivery spool (not shown) and which is passed over a roller 4, underneath frame 10 to a roller 6 from which the wire is fed to the coil winding machine. Between rollers 4 and 6, the wire extends along a straight path indicated at 8.

The frame 10 which is only schematically illustrated extends generally parallel to the path 8 of the wire and has track means in the form of two guide rails 12 mounted thereon extending generally parallel to the path 8 but spaced a vertical distance therefrom as shown in FIG. 2. Mounted on the dual guide rails 12 is the wire transport means of the present invention which includes a bed 14 which is slidable along the rails 12. Pivotably mounted on the bed 14 is a platform 18 which is rigidly secured to a shaft 20 which passes through the bed 14 as shown in FIG. 2. The other end of the shaft 20 is fixed in a guide rod 16. The shaft 20 is rotatable in the bed 14 so that pivoting of the guide rod 16 will effect a corresponding rotation of the platform 18. On the platform 18, a mounting arm 22 is pivotally secured as by a pin 24. Mounting arm 22 may be in the form of a U-shaped bracket having dependent flanges through which the pin 24 extends. The top surface of the mounting arm 22 carries the ring member 26 through which the wire 2 passes. As will be described in more detail hereinafter, the pivotal mounting of the mounting arm 22 and thus the ring member 26 is provided so that when the apparatus is not being employed to form loops, the mounting arm and ring member 26 can be pivoted to move the ring member out of engagement with the wire 2 which is being passed rapidly past frame 10 to the coil winding machine.

Figure 3:
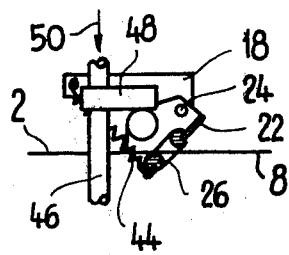
FIG. 3 is a close-up, detailed view of the wire transport means of the present invention.

Referring to FIG. 2, on frame 10, vertically above the guide rails 12, there are mounted a large pulley 28 and a smaller pulley 30 with an endless belt or chain 32 looped about the pulleys 28 and 30 whereby the belt 32 will rotate in a horizontal plane which extends generally parallel to the path 8 of the wire 2. The guide rod 16 is pivotally connected through coupling 34 to the belt or chain 32. An electric motor 38 provides power through a reduction gear 40 to the pulley 28 through a belt 36 in engagement therewith. As shown in FIG. 2, the mounting arm 22 and thus the ring member 26 are in operative engagement with the wire 2. Referring to FIG. 3, as previously mentioned, mounting arm 22 and the ring member 26 are pivotably mounted so as to be movable from a rest position in which the ring member 26 is disengaged from the wire 2. The pivoting of the mounting arm 22 into the disengaged position is accomplished by movement of an operating rod 46 which moves a lug 48 into engagement with a stop member carried on the mounting arm 22 as illustrated in FIG. 3. When the rod 46 is moved in a direction opposite to the arrow 50, for example, in the direction of arrow 52 as shown in FIG. 2, the spring means 44 will return the mounting arm and the associated ring member 26 to the wire engaging position.

Referring now to FIG. 2, the guide means of the present invention are illustrated at 54 and 56, both being located adjacent to the wire path 8 and spaced vertically beneath the two pulleys 28 and 30, respectively. Each of the posts 54 and 56 are mounted on the ends of pistons carried in cylinders 58 and 60, respectively, which may be air-actuated through hoses 62 and 64. With this arrangement, the posts 54 and 56 may be moved to intercept the path 8 and easily maintained in an adjusted position.

Cylinders 58 and 60 are each mounted on pivotable levers 66 and 68, respectively (FIG. 1), and stops 74 and 76 are provided adjacent to each of the levers to restrain swinging movement thereof of the cylinders away from each other. Normally, the tension springs 70 and 72 operate to maintain the levers 66 and 68 in contact with the stops 74 and 76, respectively. Locking means in the form of levers 82 and 84 are provided opposite the stops 74 and 76, respectively, to prevent pivoting of the levers 66 and 68 away from the stops during the twisting operation to be described hereinafter. The levers 82 and 84, are, respectively, locked in position by locking cylinders 78 and 80 which may be operated by air hoses 86 and 88.

As shown in FIG. 2, cylinder 58 and its associated post 54 are mounted through a shaft 83 on translating means in the form of a slide carriage 85 which, in turn, is mounted on a threaded shaft 98 which extends parallel to the wire path 8. The threaded shaft 98 may be suitably rotatably mounted on the frame 10 as is threaded shaft 102 which is provided with a hand crank 90. A large gear 94 is secured on shaft 102 to cooperate with a small gear 96 fixed on shaft 98 whereby rotation of shaft 102 will effect rotation of shaft 98 to effect linear translation of the slide carriage 85 in the direction of arrows 100 depending on the direction of rotation of the hand crank 90.

A twisting means 104 is also mounted on threaded shaft 102 by a piston rod 110 which fits into a cylinder 108 to provide a vertical adjustment of the carrier 106 in the direction of arrow 112. Carrier 106 is U-shaped and rotatably supports twisting wheels 114 and 116 therein. A rod 120 extends between the twisting wheels 114 and 116 and provides support for a twisting needle 122. The twisting needle 122 carries a fixed bar 123 which, at its ends adjacent the twisting wheels 114 and 116, is provided with bores for receiving spreader pins 126 and 128. The spreader pins 126 and 128 are frictionally held in the bores formed in the bar 123 so that they can be retracted in the direction of arrow 130 prior to the initiation of the twisting operation.

With cylinder 60 and its associated post 56 fixed against horizontal movement, the translating means described above for cylinder 58 and its associated post 54 and the twisting means 104 will assure that for every horizontal movement of the post 54, the twisting means 104 will assume a position halfway between the adjusted distance between the posts 54 and 56.

Figure 4:
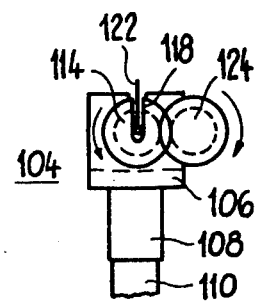
FIG. 4 is an end view of a section of the twisting means.

Referring now to FIG. 4, it will be seen that the twisting wheel 114, which is identical to twisting wheel 116, is provided with a radial slit 118 which can be aligned with the twisting needle 122 by adjustment of a drive wheel 124 which may be driven by any suitable means such as a small electric motor or belt, the details of which are not illustrated as they are conventional.

The operation of the apparatus will now be described.

Figure 7:
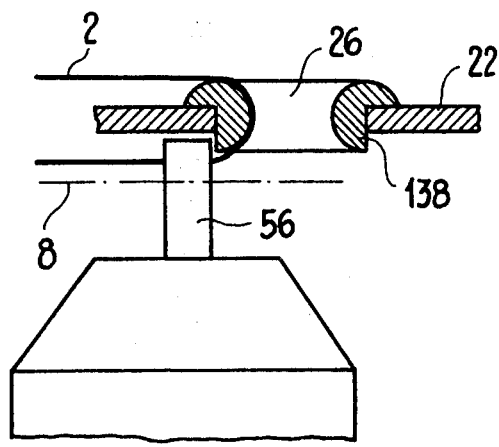
FIG. 7 is a detailed view of the ring member and one of the guide means of the present invention.
Figure 5:
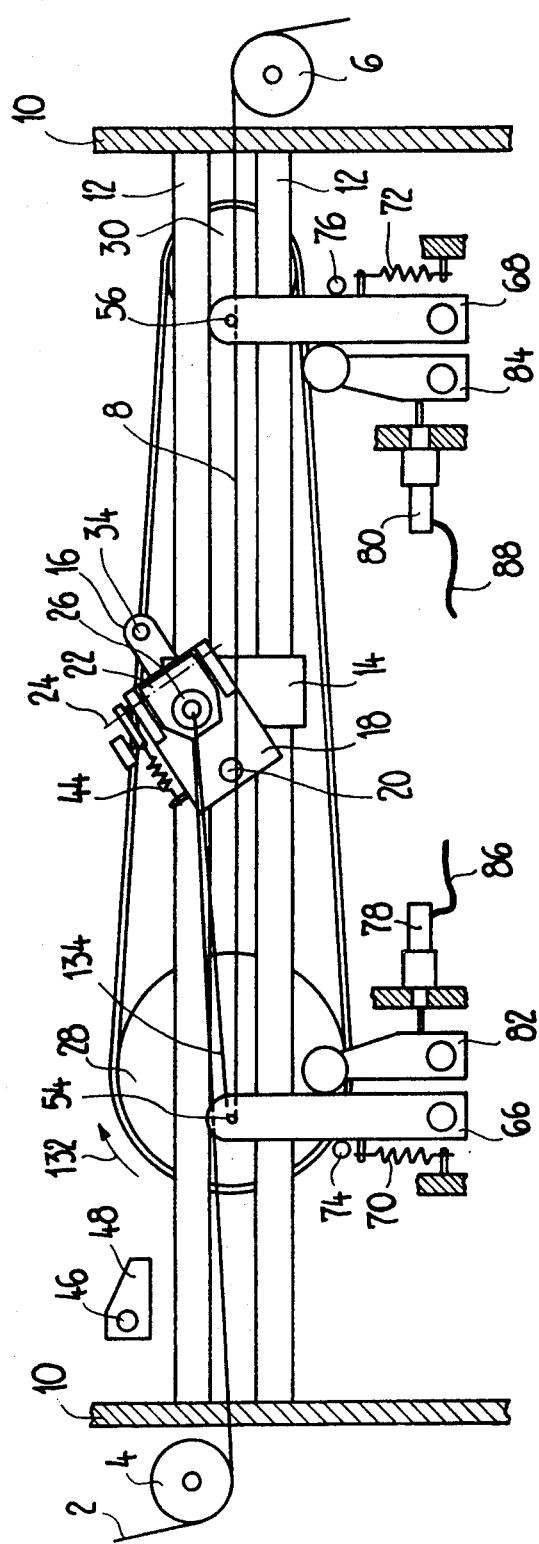
FIG. 5 is an illustration of the disposition of the elements of the apparatus of the present invention during the formation of a loop.

In FIG. 1, the ring member 26 is illustrated in its starting or rest position and, as can be seen from FIG. 2, the ring member lies in a plane that extends substantially parallel to the wire path 8 and is resiliently held in this position by the spring 44. The feed of the wire 2 to the coil winding machine upstream of roller 6 is stopped while feed of the wire 2 from the supply spool upstream of roller 4 is permitted. Motor 38 is then actuated to commence the loop forming step. As shown in FIG. 5, the bed 14 and platform 18 are moved along the tracks 12 by virtue of the connection of rod 16 to the belt 32. However, platform 18 is pivoted about the axis of shaft 20 relative to the bed 14 as it travels its predetermined route defined by the path of the belt 32 and the tracks 12. It should be understood that FIG. 5 is a bottom view so that the posts 54 and 56 are only schematically illustrated while the associated translating means and twisting means 104 are deleted for clarity. However, it will be apparent that as ring member 26 is moved from the position of FIGS. 1 and 2 to the position illustrated in FIG. 5, a loop 134 will commence to be formed by virtue of the pivoting movement of the ring member 26 relative to the wire path 8. Continued movement of the ring member 26 to a position on the opposite side of path 8 will result in the formation of a bend around post 56 by virtue of the interception of post 56 with the wire 2 as illustrated in FIG. 7. From FIG. 7, it will be seen that the ring member 26 has a relieved sector 138 of about 90° which extends through a wall of mounting arm 22, thus providing a clearance for the top of posts 56 and 54. In order to place the loops as tightly as possible around the posts 54 and 56, the radius between the shaft 20 and the ring member 26 must be dimensioned properly to provide the juxtaposition of the ring member 26 to the post 56 as shown in FIG. 7 which will also apply to the post 54. Also, the distance between the posts and the radius of the respective pulleys 28 and 30 must also be properly dimensioned as is the radius of the ring member 26 itself.

Figure 6:
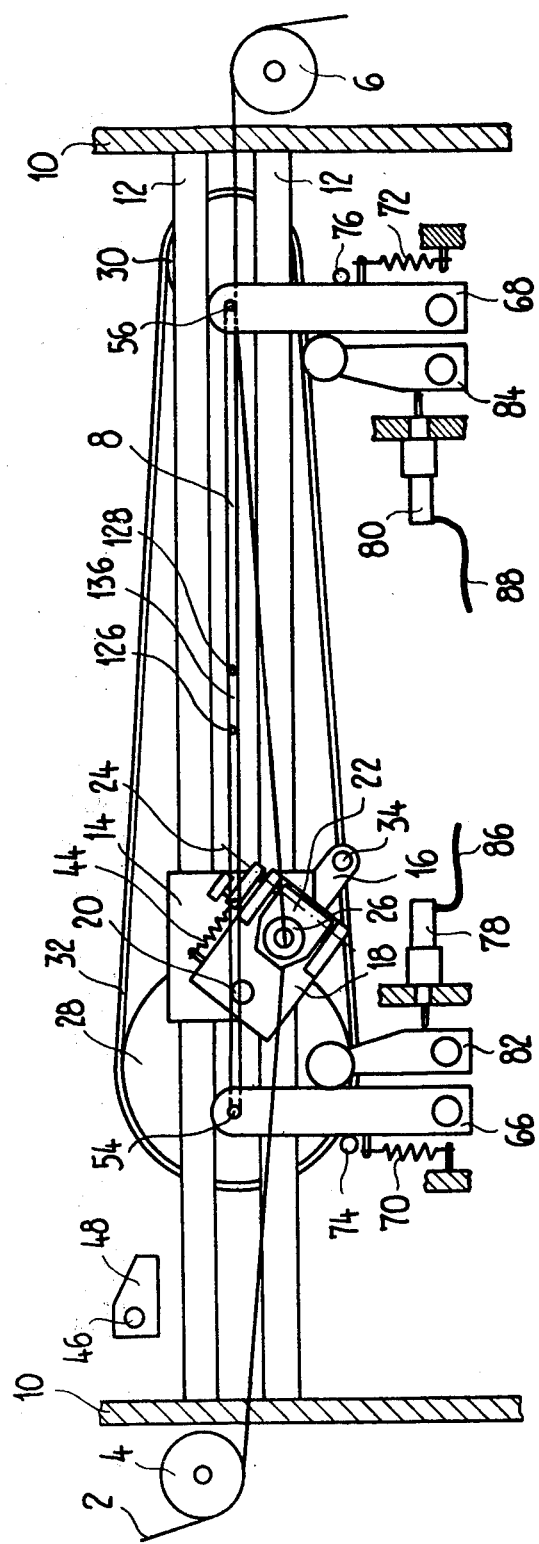
FIG. 6 is a view similar to FIG. 5 showing the disposition of the apparatus of the present invention at another stage of loop formation.

FIG. 6 shows the ring member position prior to the formation of a second loop with the first loop having already been formed between the posts 54 and 56 providing an opening 136 through which the spreading pins 126 and 128 protrude to maintain a separation through which the twisting needle 122 can easily be inserted. The number of traversals of the ring member about the path as described and illustrated will correspond to the number of loops formed extending between the posts 54 and 56.

After the desired number of loops have been formed which may be counted by a suitable electronic counter adapted to read the rotations, for example, of one of the pulleys 28 or 30, the bed 14 and, thus, the ring member 26 are returned to the starting position illustration in FIGS. 1 and 2 and the motor 38 is deactivated. Then, as shown in FIG. 2, the twisting needle is inserted into the opening maintained by the spreading pins 126 and 128 by expansion of the piston and cylinders 108 and 110. The spreading pins 126 and 128 may then be manually retracted by pushing them into the bar 123. Next, the locking cylinders 78 and 80 are released whereby the posts 54 and 56 are free to pivot on levers 66 and 68 towards each other against the force of the springs 78 and 72, respectively. The twisting wheels 114 and 116 are now rotated about the wire path 8 either manually or by a suitable electronic motor operating through the drive wheel or gear 124 (FIG. 4) whereby the tensioned loops of wire 2 are twisted by the twisting needle 122 between the posts 54 and 56. The contraction of the loops of wire resulting from the twisting is balanced by virtue of the permitted movement of the posts 54 and 56 towards the twisting needle 122, but controlled by the tension in the springs 70 and 72 to keep the loops relatively taught.

Upon completion of the twisting process as described above, the twisting means 104 as well as the posts 54 and 56 are retracted from the wire path 8 and thereby disengaged from the twisted loops. Of course, the twisted loops maintain their twisted configuration due to the fact that it is wire that is being operated on which retains its deformed configuration, as is well known. The feed to the coil winding machine is then actuated and the reinforced wire section consisting of the intertwisted loops is fed past frame 10 to the coil winding machine for completion of the electric coil manufacturing process. As previously noted, the length of the twisted loop section may be selected by adjustment of the distance between the posts 54 and 56 which is effected by rotation of the hand crank 90.

Having described the preferred embodiment of the invention, it will be apparent that various modifications may be made therein by those skilled in the art which do not depart from the spirit and scope of the present invention as defined in the appended claims.

What is claimed is:

1. Apparatus for reinforcing a length of wire by forming the wire into loops and twisting the formed loops together comprising:

first and second means for passing a continuous length of wire along a path, said first and second passing means being spaced apart a selected distance to define a substantially straight line for said path, first and second guide means each spaced apart a selected distance from each other along said path with said first guide means being located near said first means for passing and said second guide means being located near said second means for passing, wire transport means for engaging and carrying the wire, means for moving said wire transport means along a predetermined route including means for linearly reciprocating said transport means over said selected distance to bring consecutive lengths of wire into contact alternately with said first guide means and then with said second guide means so that said lengths of wire become supported on said guide means and extend in loops therebetween, the number of said loops corresponding to the number of traversals of said predetermined route by said wire transport means, twisting means disposed intermediate said first and second guide means and movable into engagement with the loops for twisting the loops together.

2. Apparatus for reinforcing a length of wire by forming the wire into loops and twisting the formed loops together comprising means for passing a continuous length of wire along a path, first and second guide means each spaced apart a selected distance from each other along said path, wire transport means for engaging and carrying the wire, means for moving said wire transport means along a predetermined route including said selected distance to bring consecutive lengths of wire into contact alternately with said first guide means and then with said second guide means so that said lengths of wire become supported on said guide means and extend in loops therebetween, the number of said loops corresponding to the number of traversals of said predetermined route by said wire transport means, twisting means disposed intermediate said first and second guide means and movable into engagement with the loops for twisting the loops together, resilient mounting means being provided for said first and second guide means so that said guide means are movable toward each other through a limited distance in response to the twisting of the wire loops, and releasable locking means being provided to prevent such movement during the formation of the wire loops.

3. Apparatus for reinforcing a length of wire by forming the wire into loops and twisting the formed loops together comprising means for passing a continuous length of wire along a path, first and second guide means each spaced apart a selected distance from each other along said path, wire transport means for engaging and carrying the wire, means for moving said wire transport means along a predetermined route including said selected distance to bring consecutive lengths of wire into contact alternately with said first guide means and then with said second guide means so that said lenths of wire become supported on said guide means and extend in loops therebetween, the number of said loops corresponding to the number of traversals of said predetermined route by said wire transport means, twisting means disposed intermediate said first and second guide means and movable into engagement with the loops for twisting the loops together, said wire transport means including a ring member, through which the wire is passed, mounted on carriage means and said means for moving said wire transport means along said predetermined route includes track means for supporting said carriage means, said carriage means being movable along said track means, and means for continuously moving said carriage means between two spaced points on said track means.

4. The apparatus as claimed in claim 3 wherein said carriage means includes a bed mounted on said track means with said track means defining a linear path extending parallel to said path of the wire, a platform pivotally mounted on said bed, said means for continuously moving said carriage means including spaced apart pulleys and an endless belt running around said pulleys, said platform having means for pivotably linking said platform to said belt so that movement of said belt will effect both translation of said carriage means along said track means and pivotal movement of said platform relative to said bed, said ring member being mounted on said platform.

5. The apparatus as claimed in claim 4 wherein said platform lies in a plane which extends generally parallel to said linear path of said track means, and is pivotable in said plane relative to said bed, said ring member being mounted on said platform by means of a mounting arm which holds said ring member so that a diameter thereof lies in a plane which is parallel to the plane in which said platform lies, said mounting arm being pivotably mounted on said platform, spring means being provided to resiliently restrain said mounting arm from pivoting and actuating means are provided adjacent one of said pulleys for pivoting said mounting arm so that said ring member will be moved to return the wire passing through said ring member to said wire's path.

6. The apparatus as claimed in claim 4 wherein said first guide means is mounted on a first slide carriage, said first slide carriage being movable parallel to said path relative to said second guide means.

7. The apparatus as claimed in claim 6 wherein said second guide means is fixed in position relative to said apparatus, one of said pulleys having a smaller diameter than the other of said pulleys and said second guide means being located adjacent said one of said pulleys.

8. The apparatus as claimed in claim 6 wherein said twisting means is mounted on a second slide carriage and translating means are provided for moving said first and second slide carriages simultaneously parallel to said path.

9. The apparatus as claimed in claim 8 wherein said translating means comprises a first threaded shaft for said first slide carriage and a second threaded shaft for said second slide carriage and reduction gear means connecting said first and second threaded shafts.

* * * * *